April 16, 1935.  T. H. LONG  1,997,644

INDUCTION FURNACE CIRCUIT

Filed March 29, 1933   2 Sheets-Sheet 1

WITNESSES:

INVENTOR
Thomas H. Long.
BY
ATTORNEY

April 16, 1935. T. H. LONG 1,997,644
INDUCTION FURNACE CIRCUIT
Filed March 29, 1933 2 Sheets-Sheet 2

WITNESSES:
C. J. Weller.
H. M. Biebel

INVENTOR
Thomas H. Long.
BY
W. R. Coley
ATTORNEY

Patented Apr. 16, 1935

1,997,644

UNITED STATES PATENT OFFICE 1,997,644

INDUCTION FURNACE CIRCUIT

Thomas H. Long, Irwin, Pa., assignor to Westinghouse Electric & Manufacturing Company, East Pittsburgh, Pa., a corporation of Pennsylvania Application March 29, 1933, Serial No. 663,366

6 Claims. (Cl. 175—363)

My invention relates to energy supply systems and particularly to a system for translating direct current energy into alternating current energy at a predetremined frequency.

An object of my invention is to provide a relatively simple system embodying a minimum number of different elements for inverting direct current electric energy into alternating current electric energy.

Another object of my invention is to provide a system for inverting direct current electric energy into alternating current electric energy utilizing an electro-magnetic energy-storing device and an electro-static energy-transfer means, the charge and discharge of the electromagnetic means being controlled by a plurality of electric discharge devices.

Another object of my invention is to provide a system for transforming direct current energy into alternating current energy by inverting the direct current energy into impulses of relatively high frequency and then inverting said high frequency impulses into an alternating current of lower frequency.

Another object of my invention is to provide a highly efficient source of high frequency alternating current.

Still another object of my invention is to provide a system of energy supply including electromagnetic and electrostatic energy storing and transferring means with a suitable control that shall result in operating the alternating current load circuit at normal power factor, in which the electrostatic devices are used as switching accessories and in which at any moment the energy stored electrostatically is much less than the amount stored electromagnetically.

In practicing my invention, I provide a source of direct current electric energy, a pair of electromagnetic energy storage devices, at least one of said devices being an inductive load circuit, a plurality of electrostatic energy-transfer devices connected to the taps of a tapped transformer through a plurality of electric valves, and means for igniting the valves in predetermined recurrent sequence to control the charge and discharge of the electrostatic devices. An alternating current load circuit, which may comprise the energizing coil of an induction furnace, is coupled to the direct circuit through the transformer.

Figure 1:
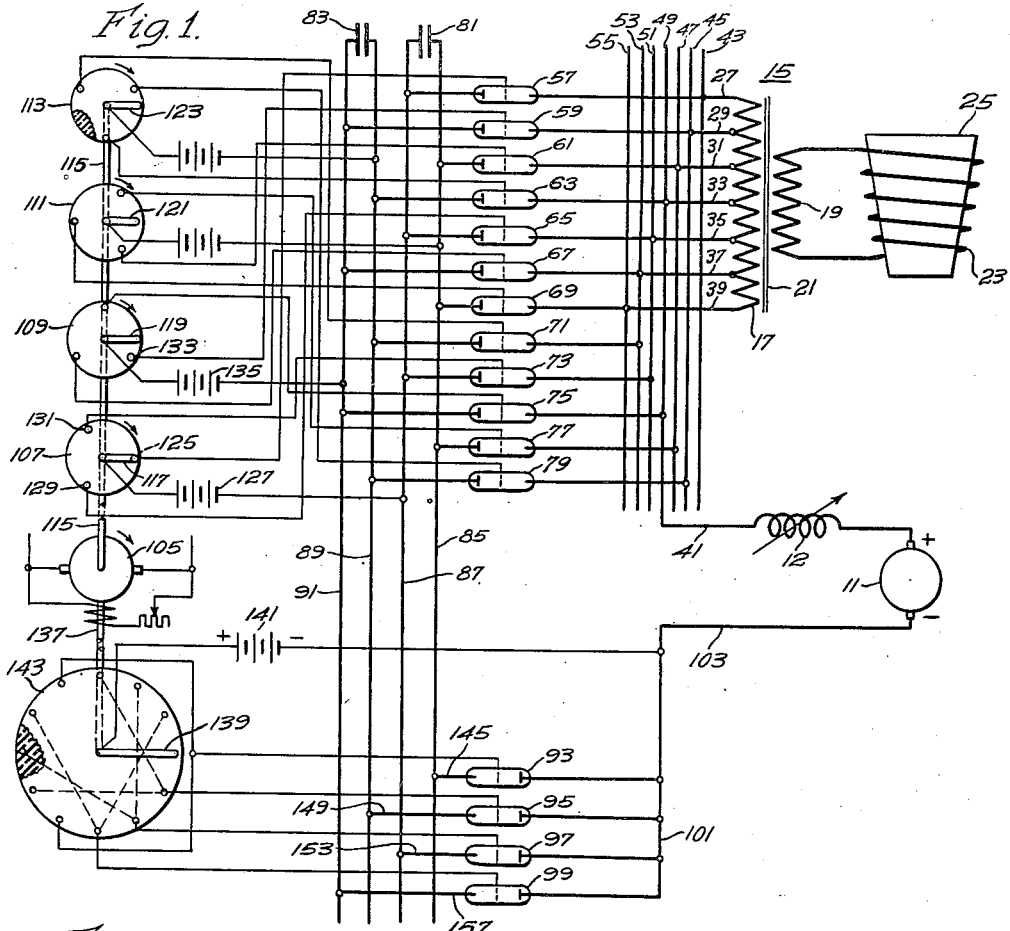
Figure 2:
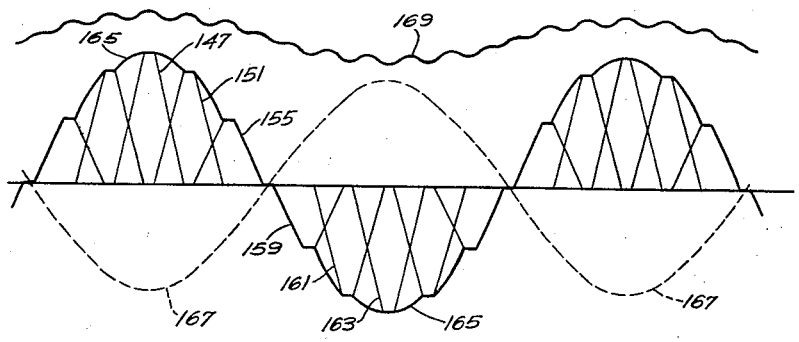
Figure 3:
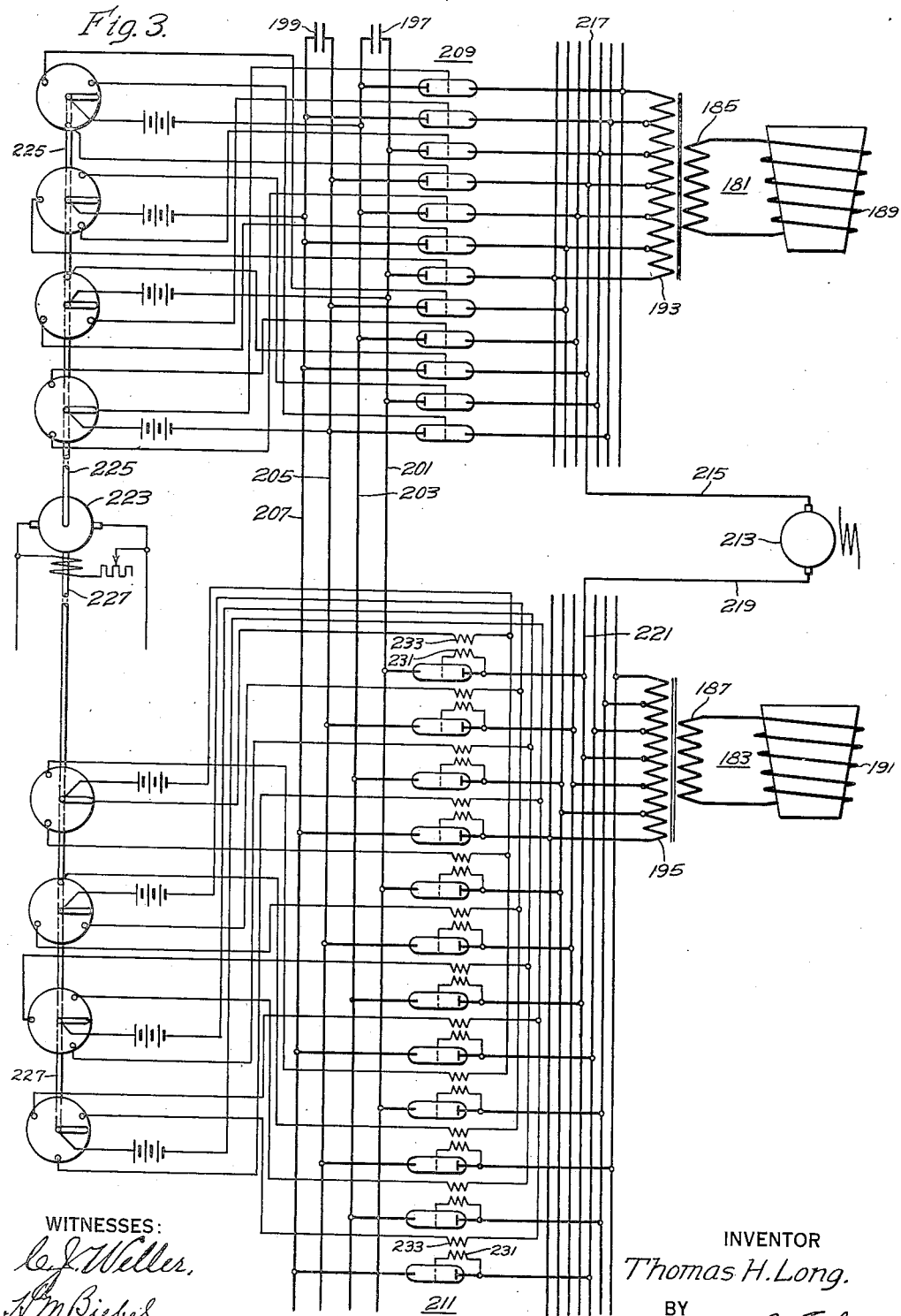

In the drawings, Figure 1 is a diagram of connections of one form of system embodying my invention, Fig. 2 is a diagram illustrating current flow in the system, and Fig. 3 is a diagram of connections of a modified form of system embodying my invention.

Referring first to the system illustrated in Fig. 1 of the drawings, I have there shown a source of direct current electric energy indicated as a generator 11. In circuit therewith is a reactor 12 which may be of any suitable or desired construction and which is shown as being adjustable in order that slight variations may be made in the constants thereof as may be found desirable in the operation of the system.

The value of the inductance of the reactor 12 is such that when taken in combination with the other constants of the circuit, which circuit will be hereinafter described in detail, the current traversing the source 11 and the reactor 12 will remain substantially constant.

I provide a transformer 15 which includes a primary winding 17 and a secondary winding 19 as well as an iron core 21, all of these parts being shown schematically only. While I have illustrated a transformer having separate primary and secondary windings I do not wish to be limited thereto as an auto-transformer may also be used. It is further to be understood that the number of turns in the primary and in the secondary windings and the sizes of conductors will be such as to conform to the voltage and current conditions existing in the respective circuits. It may further be pointed out that primary winding 17 is connected, as will be hereinafter set forth in greater detail, in the direct current circuit, while the secondary winding 19 is the source of supply of alternating current to an inductive energy-translating device 23 which is here shown as comprising the energizing coil of an induction furnace which latter is shown schematically by a crucible 25. The energizing winding 23 and the connections therebetween and the secondary winding 19 may be considered as constituting the load circuit traversed by an alternating current, as will hereinafter be described.

It may further be here pointed out that the primary winding 17 is provided with a predetermined number of taps which are numbered 27, 29, 31, 33, 35, 37 and 39, respectively. Tap 33 is connected to the midpoint of winding 17 and a conductor 41 is also connected to this midpoint as well as to one terminal of reactor 12. The number of turns included between the midtap 33 and taps 31 and 35 on each side thereof, and the number of turns included between midtap 33 and taps 29 and 37 will be determined by the requirement that the taps be so spaced as to conform to a sine law. That is, if we assume for purposes of illustration that the winding 17 includes 200 turns, the number of turns between midtap 33 and tap 31 will be 50, and the number of turns between midtap 33 and tap 29 will be 87, the same holding true with regard to the taps on the other half of the transformer winding.

A plurality of conductors 43, 45, 47, 49, 51, 53 and 55 are provided to which are connected in sequence the ends of taps 27 to 39, inclusive, as is shown more particularly in the upper half of that part of Fig. 1 illustrating these conductors.

I provide control means in the form of a plurality of electric valves 57, 59, 61, 63, 65, 67, 69, 71, 73, 75, 77 and 79, which may be any one of a number of different types of such devices such as, for instance, power grid-glow tubes. Each of these valves includes a suitable casing, an anode, a cathode and a control grid which are shown diagrammatically only, in Fig. 1 of the drawings. This type of tube remains non-conducting until the grid or other ignition device in the tube is suitably energized to cause the tube to become electrically conducting, and it will remain conducting until the current traversing the tube becomes zero.

The anode of tube 57 is electrically connected to the junction of conductor 43 and tap 27, the anode of tube 59 is connected to the junction of tap 29 and conductor 45, and so on similarly for the other tubes up to tube 69, which is connected to the junction of tap 39 and conductor 55, after which the connections between the tubes 71 to 79 are made to the respective conductors in an upwardly ascending order or scale, the anode of tube 71 being connected to conductor 53, the anode of tube 73 being connected to conductor 51, etc., as shown in Fig. 1 of the drawings. I provide further a plurality of electrostatic devices here shown as condensers 81 and 83, to the respective terminals of which are connected conductors 85, 87, 89 and 91 as may be seen by reference to Fig. 1 of the drawings. The cathode of tube 57 is connected to conductor 87 and the cathode of tube 59 is connected to conductor 91. The cathode of tube 61 is connected to conductor 85 and the cathode of tube 63 is connected to conductor 89. Each succeeding group of four tubes, namely 65, 67, 69, 71, and 73, 75, 77, 79 are connected in the same manner to the respective conductors 85 to 91, as has just been described for the group of tubes 57 to 63, inclusive, that is in recurrent similar sequence.

I provide further another group of electric valves which may be of the same type as hereinbefore described and which are numbered 93, 95, 97 and 99. The anode of tube 93 is connected to conductor 85, the anode of tube 95 is connected to conductor 89, the anode of tube 97 is connected to conductor 87 and the anode of tube 99 is connected to conductor 91. The cathodes of tubes 93 to 99 inclusive, are connected to a single conductor 101. Conductor 101 is connected through a conductor 103 to one terminal of source 11.

As it is desired to effect ignition of the respective groups of valves 57 to 79, inclusive, in predetermined recurrent sequence, and to further effect ignition of valves 93 to 99, inclusive, also in predetermined recurrent sequence, but more frequently, I provide a control means for effecting such ignition of the valves, which may include an electric motor 105 which may be either of the direct current or of the alternating current type.

If it is a direct current type of motor it may be provided with suitable means for adjusting its speed, whereby in combination with other constants of the system it will determine the frequency of the energy transfer between condensers 81 and 83 and the energy-storing devices 23 and 12 and also the frequency of the alternating current traversing the energizing coil 23.

A plurality of disks 107, 109, 111 and 113 of insulating material are mounted on a suitable shaft 115 which may be either an extension of the shaft of motor 105 or a separate shaft, and it is to be understood that this shaft is suitably supported and that the disks 107 to 113 are supported by any suitable means (not shown) in fixed position relatively to shaft 115. Four rotatable electric-conducting arms 117, 119, 121 and 123 are rigidly but insulatedly mounted on or secured to the shaft 115 to rotate therewith. I provide further electric terminals, three in number, on each of the disks 107 to 113, inclusive. It may be noted, by reference to Fig. 1 of the drawings, that the terminal 125 on disk 107 is engaged, at the particular instant shown in the drawings, by arm 117, to close a circuit between the control grid of tube 57 and the cathode thereof, a source of direct current energy 127 being provided in this circuit. The positive terminal of this source is connected in a suitable manner to arm 117 so that when arm 117 engages terminal 125, the control electrode of tube 57 will have impressed thereon a positive potential whereby to make the tube electric-conducting, which condition will continue until the value of the current traversing the tube reaches zero, after which the tube becomes non-conducting again and will remain so until the reenergization of the electrode or as it may be termed, reignition of the tube is effected. The disk 107 has terminals 129 and 131 mounted thereon in addition to terminal 125, these three terminals being spaced 120° apart peripherally of the disk. The other disks 109, 111 and 113 have mounted thereon respectively three terminals spaced 120° apart from each other, terminal 133 on disk 109 being displaced 30° with relation to terminal 125 on disk 107. This means that a current impulse, from a source 135 associated with disk 109, will be available when arm 119 has been turned through 30° from the position shown in the drawings, so that the control electrode of tube 59 is energized to cause the tube to become electric conducting.

As it is believed unnecessary to designate each of the terminals on the other disks by number or to designate the conductors connecting these terminals with the control electrodes of tubes 57 to 79, inclusive, they have not been so numbered, but the connections between the control electrodes and the respective means for energizing them have been clearly shown in each case. It is to be noted particularly that tubes 57 to 79 are energized in sequence during one complete revolution of the rotor of the motor 125, after which they are again energized in the same sequence for a purpose to be set forth hereinafter.

It is desired to simultaneously energize the control electrodes of tubes 93 to 99, inclusive, at the same time that the three groups of tubes are energized. For this purpose I provide a second shaft extension 137 on which is mounted an electric-conducting arm 139 suitably insulated from the shaft and having a source of direct current electric energy 141 connected thereto which may be a battery. A fixed disk 143, of electric-insulating material, has mounted thereon twelve terminals adapted to be engaged in rotary sequence by arm 139. The twelve terminals shown are connected in groups of three each, each group of three terminals being connected to the control electrode of tubes 93, 95, 97 and 99, respectively, as shown in the drawings. The negative terminal of battery 141 is connected to conductor or bus bar 101.

Let it be assumed that the source 11 is being operated to provide a suitable direct current voltage and let it be further assumed that the system is in operation and at any given instant the parts of the tube controller occupy the positions shown in Fig. 1 of the drawings. It will be evident that since arm 117 engages terminal 125, tube 57 is electrically conducting, and as arm 139 engages a terminal which is electrically connected to the control electrode of tube 93, this tube will also be electrically conducting. It is, therefore, evident that a current pulse will traverse the direct current circuit including at this particular instant reactor 12, conductors 41 and 49, the upper half of winding 17, tube 57, condenser 81, a part of conductor 85, conductor 145, tube 93, and conductors 101 and 103 to the other terminal of source 11. As has already been set forth hereinbefore, the value of reactor 12 is such as to maintain a substantially constant current in the direct current supply circuit so that this current traversing one half of the total number of turns in winding 17 will generate an ampere turn curve which may be illustrated schematically by curve 147 in Fig. 2 of the drawings.

While tube 57 and tube 93 are still electric-conducting, the rotation of arm 119 has brought it into engagement with terminal 133 whereby tube 59 is made electric conducting and the rotation of arm 139 has brought it into engagement with a terminal which is electrically connected to the control electrode of tube 95. A second current pulse will be sent through a circuit including reactor 12, conductor 41, a lesser part, namely 87% of the turns in winding 17, through tap 29, tube 59 to condenser 83, and from there through conductors 89 and 149, tube 95, and conductors 101 and 103 to source 11. This provides an ampere turn pulse which may be shown diagrammatically by curve 151 of Fig. 2 of the drawings.

Upon further rotation of shaft 115, arm 121 will be brought out into engagement with a terminal connected to the control electrode of tube 61. This permits of the discharge of condenser 81 through conductors 87 and 153, tube 97, which was energized simultaneously with tube 61, conductors 101 and 103, source 11, reactor 12, conductor 41, a still further reduced number of turns of the upper half of winding 17, tap 31, tube 61 and from there to conductor 85 connected to the other terminal of condenser 81. The current pulse thereby generated provides an ampere turn pulse which may be indicated generally by curve 155 of Fig. 2.

A further turning movement through 30° of shaft 115 causes arm 123 to engage a terminal on disk 113 whereby tube 63 is made electric conducting, while at the same time tube 99 is also energized to make it electric conducting. In this case, condenser 83 is discharged through a circuit including conductors 91 and 157, tube 99, conductors 101 and 103, source 11, reactor 12, conductor 41, tap 33, tube 63 and from there to conductor 89 and to the other terminal of the condenser. In this case while there is a current pulse there is no ampere turn pulse or curve because none of the turns of winding 17 are included in the circuit.

Further rotation will cause reversed ampere turn pulses as shown by curves 159, 161 and 163 in Fig. 2 of the drawings which apply to similar operation of tubes 65, 67 and 69 and corresponding tubes in the other part of the circuit, it being evident that the ampere turn pulses 159 to 163 are negative relatively to current pulses 147, 151 and 155. By providing a plurality of taps so spaced as to approach a sine distribution, the summation of the ampere turn pulses in primary winding 17 will approximate a sine wave shape, and this curve is shown by curve 165 in Fig. 2 of the drawings, the secondary load current being shown by curve 167. It is, of course, obvious that the effect of the magnetizing current in the transformer etc., is neglected but this will make but slight changes in the shapes or relative positions of the ampere turn or current curves.

It is thus evident that there will be a transformation of electric energy from the direct current source 11 into a series of current pulses in which the current value varies but slightly, as is shown by curve 169 in Fig. 2 of the drawings, but providing an inversion of the direct current energy into a series of pulsations which may be added by or in transformer 15 with the cooperating action of reactor 12, to provide a lower frequency alternating current. Thus in the system shown in Fig. 1 of the drawings the number of charges and discharges of the electrostatic energy transfer means may be considered as 720 per second, it being understood, of course, that each condenser is charged and discharged 360 times per second, while the frequency of the true alternating current in the load circuit is 60 cycles per second. The number of pulsations of the current in the direct current supply circuit is 120 per second.

It is further obvious that there will be a transfer of energy between the alternating current load circuit and reactor 12, energy being stored in one part of the system including the load circuit and the transformer during such times as the ampere turn curve is increasing (either in a negative or in a positive connection) while it is being stored in reactor 12 when the values shown in curve 165 are decreasing. It may be noted also that the electrostatic devices are used to transfer energy from one part of the system to the other, this use being incidental to their use as switching accessories.

It has been pointed out that the direct current pulses in the supply circuit start from zero value, reaches a maximum, and then drop to zero. A fully charged condenser will act as a means for blocking the flow of current in the circuit in which it is included, by which action that valve included in the circuit is again made non-conducting.

The discussion of the system shown in Fig. 1 has pointed out the need of energy-storing devices, as constituted by the reactor 12, and the system shown in Fig. 3 of the drawings obviates the necessity for an extra energy-storing device. This system will now be described in such detail only, however, as to make it clear wherein it differs specifically from the system of Fig. 1 of the drawings.

Instead of using a single alternating current load circuit, I use two alternating current load circuits represented by reference numerals 181 and 183, respectively, each circuit including secondary transformer windings 185 and 187, respectively, and induction furnace energizing coils 189 and 191, respectively. Secondary coil 185 is part of a transformer including primary winding 193 while secondary winding 187 is part of a transformer including a primary winding 195. The same general set of connections and valves are provided with and connected to the respective tapped primary windings 193 and 195, as hereinbefore explained in connection with Fig. 1 of the drawings, except that while twelve valves are connected to primary winding 193 in the same manner as was set forth in connection with Fig. 1 of the drawings, the twelve valves associated with primary winding 195 are connected thereto in similar sequence but displaced by 90 electrical degrees therefrom.

Condensers 197 and 199 are provided having conductors 201, 203, 205 and 207 connected thereto as shown in Fig. 3 of the drawings, which are connected in recurrent sequence similar to the cathodes of the first set of valves 209, while they are connected in predetermined recurrent sequence similar to the anodes of the second group of valves 211 but displaced by ninety electrical degrees. The source of direct current energy is indicated by the reference character 213 and may be constituted by a direct current generator. One terminal of source 213 is connected by a conductor 215 to the middle conductor 217 of the group of conductors connected to tapped winding 193, while the other terminal of source 213 is connected by a conductor 219 to the middle conductor 221 of the conductors connected between tapped winding 195 and the group 211 of electric valves. The location of the taps on windings 193 and 195 is the same as was set forth for the taps of primary winding 17. The valves in group 211 have their anodes connected to the respective conductors 201, 203, 205 and 207 while their cathodes are connected to the taps of winding 195.

Means for controlling both groups 209 and 211 of electric valves to ignite them in predetermined simultaneous and recurrent sequence includes a motor 223 which, as was hereinbefore explained, may be constituted by an adjustable speed direct current motor. A pair of shafts 225 and 227 have each mounted thereon and insulated therefrom four contact arms of the same general kind as was hereinbefore described in connection with Fig. 1 of the drawings. These respective arms cooperate with three terminal members on each disc on insulating material of the same kind as was hereinbefore described in connection with Fig. 1 of the drawings, and the connections between the arms mounted on, and rotating with, the shaft extensions and the terminals on the disks is the same for group 209 of electric valves as was hereinbefore described.

In order to avoid short-circuiting portions of primary winding 195, the electric valves in group 211 are ignited in a slightly different manner, as by providing each tube with an independent or electrically insulated control circuit represented by a secondary winding 231 connected to a cathode and a control grid, the energization therefor being provided by a primary winding 233 having connected thereto at predetermined intervals a source of direct current energy associated with one of the disks on shaft extension 227.

If we assume that the system shown in Fig. 3 of the drawings is in operation and that the control means are in the positions shown in this figure of the drawings, a current pulse will traverse the primary circuit through conductor 215, conductor 217 to the mid-tap of winding 193 through the upper half of this winding, the first tube at the upper end of group 209, condenser 197, conductor 201, the first tube on the upper end of group 211 to conductor 221, and from there through conductor 219 to the other terminal of source 213. The same recurrent sources of energizing impulses for each pair of tubes in the group 209 and 211 will be provided by the control means actuated by motor 223 and the same series of current pulses and of ampere turn pulses in the two windings 193 and 195 will be provided as was hereinbefore set forth in regard to the primary winding 17 and the cooperating group of twelve valves shown in Fig. 1 of the drawings. Instead, however, of using a separate or external reactor, the respective alternating current load circuits and particularly the coils 189 and 191 constitute the alternate energy-storing means. While it is desirable that all of the conditions in the two load circuits 181 and 183 be the same at all times in order to obtain optimum operating conditions of the system, small variations in the operating conditions of one of these circuits will not seriously affect the operating conditions of the system.

The system embodying my invention thus provides a means for inverting direct current energy into alternating current energy at a higher than normal frequency by the use of sequentially controlled valves and a plurality of electrostatic energy transfer devices, said pulses being then summated into an alternating current of a lower frequency and thereafter transferred to a load circuit which is electromagnetically coupled to the direct current supply circuit. The provision of a plurality of taps on one of the windings of a transformer permits of a close approximation to a sine shape wave of inductive effect.

While I have illustrated and described a particular number of electric valves, it is obvious that other numbers of valves can be used, following the general idea above set forth and shown in the drawings. It is further obvious that other control means for the valves may be used and I therefore do not wish to be restricted to the particular means shown for effecting such recurrent sequential ignition of the tubes.

Variations in the speed of the small motors driving the rotating arms enables the frequency of the current in the load circuit to be varied as may be desired. While I have specifically mention 60 cycles, my system is not limited thereto and may use much higher frequencies, say on the order of 500 cycles per second or even higher.

Various modifications may be made in the system embodying my invention without departing from the spirit and scope thereof, and I desire, therefore, that only such limitations shall be placed thereon as are imposed by the prior art or as set forth in the appended claims.

I claim as my invention:

1. In a system of energy supply, a direct current supply circuit having a reactor therein, a load circuit, means for transmitting energy from the supply circuit to the load circuit including a pair of condensers, means for recurrently charging said condensers in sequence with cyclically varying energy impulses of differing values and for then discharging said condensers in the same sequence, and a magnetic coupling between the load circuit and the condenser circuit to transfer energy to the load circuit.

2. In a system of energy supply, a direct current supply circuit, an alternating current load circuit, means in the direct current supply circuit for transferring energy to the load circuit including a tapped transformer, a plurality of condensers connected to the taps, means including a plurality of electric valves connected to the taps of the transformer for causing recurrent sequential charge and discharge of the condensers through the supply circuit and transformer, the number of taps and valves being a multiple of the number of condensers and means connecting the load circuit to the transformer.

3. In a system of energy supply, a direct current circuit including a source of direct current, an alternating current load, an electromagnetic energy storage device in series circuit with the source of direct current adapted to maintain a substantially constant current value therein, a transformer linking the alternating current load with the direct current circuit, electrostatic energy transfer means, a plurality of electric valves whose number is a multiple of the number of energy transfer means, connections between the electrostatic means and the transformer and rotating means for controlling the electric valves in recurrent sequence to charge and discharge the electrostatic means through the direct current circuit.

4. In a system of energy transfer, a direct current circuit including a source of direct current, an alternating current load circuit, an electromagnetic energy storage device in series circuit with the source of direct current adapted to maintain a substantially constant current value therein, a transformer linking the load circuit with the direct current circuit and having a plurality of taps on one winding, a pair of condensers, a plurality of electric valves connected between the taps and the condensers, and rotating means for controlling the electric valves in recurrent sequence to charge and discharge said pair of condensers through said transformer.

5. A system as set forth in claim 4 in which the taps on the transformer winding are connected thereto according to a sine function.

6. A system as set forth in claim 1 in which the successive energy impulses of the same sign partially overlap each other.

THOMAS H. LONG.